United States Patent [19]

Park

[11] Patent Number: 5,263,332

[45] Date of Patent: Nov. 23, 1993

[54] TEMPERATURE CONTROL METHOD FOR REFRIGERATOR

[75] Inventor: Seong S. Park, Kyungsangnam, Rep. of Korea

[73] Assignee: Goldstar, Co., Ltd., Seoul, Rep. of Korea

[21] Appl. No.: 940,325

[22] Filed: Sep. 3, 1992

[30] Foreign Application Priority Data

Sep. 3, 1991 [KR] Rep. of Korea ............... 15386/1991

[51] Int. Cl.$^5$ ........................................... G05D 23/32
[52] U.S. Cl. ........................................ 62/157; 62/131; 62/161; 62/180
[58] Field of Search ................ 62/157, 231, 158, 229, 62/131, 161, 162, 164, 153, 208, 209, 180, 213; 236/47

[56] References Cited

U.S. PATENT DOCUMENTS

| | | | |
|---|---|---|---|
| 4,297,852 | 11/1981 | Brooks | 62/153 |
| 4,481,785 | 11/1984 | Tershak et al. | 62/153 |
| 5,003,785 | 4/1991 | Petri et al. | 62/131 |

Primary Examiner—Harry B. Tanner

[57] ABSTRACT

A temperature control method for use in a refrigerator comprises a normal operation step for controlling a compressor and a fan to maintain a temperature inside a refrigerating compartment between a positive limit temperature and a negative limit temperature, both derived from a set temperature input by a user; a door-open control step for stopping the fan when a door-open is detected; a reset temperature setting step for setting a reset temperature based on said door-opening time; and a reset temperature operation step for executing a cooling operating by driving a compressor and a fan until the temperature inside the refrigerating compartment decreases to the reset temperature, lower than the set temperature, if it is detected during the normal operating that the reset temperature has been reset. The method enhances the refrigerating efficiency of a refrigerator by promptly restoring the temperature of food contained in the refrigerating compartment which has risen by external air flowing into the refrigerating compartment as a result of an open door.

8 Claims, 6 Drawing Sheets

TEMPERATURE CONTROL METHOD FOR REFRIGERATOR

BACKGROUND OF THE INVENTION

1. Field of the Invention

The present invention relates to a temperature control method for use in a refrigerator which enhances cooling efficiency by promptly restoring a variation of an load temperature caused by a open door.

2. Description of the Prior Art

A conventional temperature control system for use in a refrigerator, shown in FIG. 1 comprises an alternate current (AC) power supply 17, a direct current (DC) power supply 16, a compressor 12, a compressor driving unit 11, a fan 14, a fan driving unit 13, a temperature setting unit 18 for setting a temperature inside a refrigerating compartment, a temperature detecting unit 19 for detecting a temperature inside the refrigerating compartment, a door-open detecting unit 15 for detecting an open door, and a central processing unit 10 for controlling the whole operation of a refrigerator upon receiving signals from the temperature detecting unit 15, the door-open detecting unit 19, and the temperature setting unit 18.

In the temperature control system above, when power is supplied to the AC power supply 17, the power is converted into a direct current at the DC power source 16 and supplied to the respective units so that the temperature inside the refrigerating compartment is controlled in accordance with the flow-chart, as shown in FIG. 2.

That is, when a temperature inside the refrigerating compartment is set by a user via the temperature setting unit 18, the central processing unit 10 sets a cooling operation flag (FLAG 1="1") based on the temperature which has been set by the user. At this moment, the temperature is set as a positive (+) limit temperature and a negative (−) limit temperature.

Thereafter, when the cooling operation flag (FLAG 1) is in a set state (FLAG 1="1"), the compressor 12 and the fan 14 are driven by the compressor driving unit 11 and the fan driving unit 13, respectively, upon the control of the central processing unit 10.

If the cooling operation flag (FLAG 1) is in a reset state (FLAG 1="0"), a temperature inside the refrigerating compartment which is detected at the temperature detecting unit 19 is compared with the positive (+) limit temperature which has been set in the temperature setting unit 18. If the detected temperature inside the refrigerating compartment is equal to or higher than the positive (+) limit temperature, the cooling operation flag (Flag 1) is set (FLAG 1=1") and an open door is detected. On the contrary, if the detected temperature inside the refrigerating compartment is lower than the positive (+) limit temperature, the cooling operation flag (FLAG 1) is maintained at a reset state (FLAG 1="0") and then an open door is detected.

Also, in case that a cooling operation is executed by driving the compressor 12 and the fan 14, the temperature inside the refrigerating compartment which is detected at the temperature detecting unit 19 is compared with the negative (−) limit temperature. If the detected temperature is equal to or lower than the negative (−) limit temperature, the compressor 12 and the fan 14 are stopped and the cooling operation flag (FLAG 1) is reset (FLAG 1="0") and then a door-open is detected. If the temperature inside the refrigerating compartment is higher than the negative (−) limit temperature, the compressor 12 and the fan 14 are continuously driven and an open door is detected.

The cooling operation is executed until the temperature inside the refrigerating compartment reaches to the negative (−) limit temperature, and then the compressor 12 and the fan 14 are stopped. Thereafter, when the temperature inside the refrigerating compartment rises to the positive (+) limit temperature and the cooling operation is stopped, the cooling operating flag (FLAG 1) is set to start the cooling operation.

When a closed door detected during the cooling operation is described above, it is discriminated as to whether the cooling operation flag (FLAG 1) is in a set-state (FLAG 1="1").

If an open door is detected, the fan 14 is turned off and waiting until closed door is detected. Thereafter, when closed door is detected, the cooling operation flag (FLAG 1) is set (FLAG 1="1") and then the operation of refrigerator is controlled by repeating the above-mentioned procedures.

At this moment, positive (+) and negative (−) deviations are given to the set temperature in order to prevent frequent start/stop of the compressor 12 and other units and the operation of the refrigerator is controlled so that the temperature is maintained between the positive (+) and negative (−) deviations. And, when the temperature inside the refrigerating compartment reaches the negative (−) limit temperature (t3' in FIG. 3), the central processing unit 10 stops the compressor 12 and the fan 14 and the resets the cooling operation flag until the temperature inside the refrigerating compartment rises to the positive (+) limit temperature, thereafter executing an open door detecting step.

In such a conventional temperature control method for a refrigerator, when an open door is not detected, as shown in FIG. 3, a cooling operation is started at a point t2' in which a temperature inside the refrigerating compartment reaches the positive (+) limit temperature and the cooling operation is stopped at a point t3' in which the temperature inside the refrigerating compartment reaches the negative (−) limit temperature. As a result, a load temperature is maintained between a temperature which has been set by a user and a positive (+) limit temperature. The load represents food to be refrigerated.

After the door is opened (t1 in FIG. 3) a cooling operation is started again at the point t2 that the door is closed, thereafter the cooling operation is stopped at the point t3 that the temperature inside the refrigerating compartment goes down to the negative (−) limit temperature.

When the door is opened at the point t1 of FIG. 3, a closed door is awaited and the fan 14 is stopped. At this moment, the temperature inside the refrigerating compartment and the load temperature rise abruptly (t1-t2 in FIG. 3).

Thereafter, when a closed door is detected, the refrigerating compartment is cooled to the negative (−) limit temperature. At this moment, the cooling operation is stopped irrespective of whether the load temperature reaches the negative (−) limit temperature and when the temperature inside the refrigerating compartment rises again up to the positive (+) limit temperature (point t2'), the cooling operation is started again.

In the case where the door is opened for a long time, the temperature inside the refrigerating compartment and the load temperature rise in a quickly so that a cooling operation is started again and then the cooling operation is stopped (point t3) based on the temperature inside the refrigerating compartment. At this moment, the cooling operation is stopped in a state that the load temperature does not reach the desired temperature. Accordingly, the load temperature can be dropped down to the desired set temperature only when a cooling operation is started again because of an increase of the temperature inside the refrigerating compartment up to the positive (+) limit temperature.

That is, in the conventional temperature control method for use in a refrigerator, since the temperature control is executed based on the temperature inside the refrigerating compartment, it takes a relatively long time to reach a set temperature, in cases where the load temperature is high due to an open door, thereby excerting a bad influence on the load, i.e., the food to be refrigerated.

SUMMARY OF THE INVENTION

Accordingly, it is an object of the present invention to provide a temperature control method for a refrigerator which is capable of promptly stabilizing a temperature inside a refrigerating compartment and a load temperature by causing the temperature to be re-set lower than a negative (−) limit temperature when an open door and a closed door are detected.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a temperature control method for use in a refrigerator comprises a normal operation step for controlling a compressor and a fan to maintain a temperature inside a refrigerating compartment between a positive (+) limit temperature and a negative (−) limit temperature, both derived from a set temperature input by a user; a door-open control step for stopping the fan when a door-open is detected and calculating a door-opening time until a door-close is detected; a re-set temperature setting step for setting a re-set temperature based on said door-opening time; and a re-set temperature operation step for executing a cooling operation by driving a compressor and a fan until the temperature inside the refrigerating compartment decreases to the re-set temperature, beyond the set temperature, if it is detected during the normal operation that the re-set temperature has been re-set.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DESCRIPTION OF THE PREFERRED EMBODIMENTS

Referring now in detail to the drawings for the purpose of illustrating preferred embodiments of the present invention, the temperature control method for use in a refrigerator, comprises a normal operation step (S10) for controlling a compressor and a fan to maintain a temperature inside a refrigerating compartment between a positive (+) limit temperature and a negative (−) limit temperature, both derived from a set temperature input by a user; a door-open control step (S20) for stopping the fan when a door-open is detected and calculating a door-opening time until a door-close is detected; a re-set temperature setting step (S30) for setting a re-set temperature based on said door-opening time; and a re-set temperature operation step (S40) for executing a cooling operation by driving the compressor and the fan until the temperature inside the refrigerating compartment decreases to the re-set temperature, beyond the set temperature, if it is detected during the normal operation that the re-set temperature has been re-set.

Figure 1:
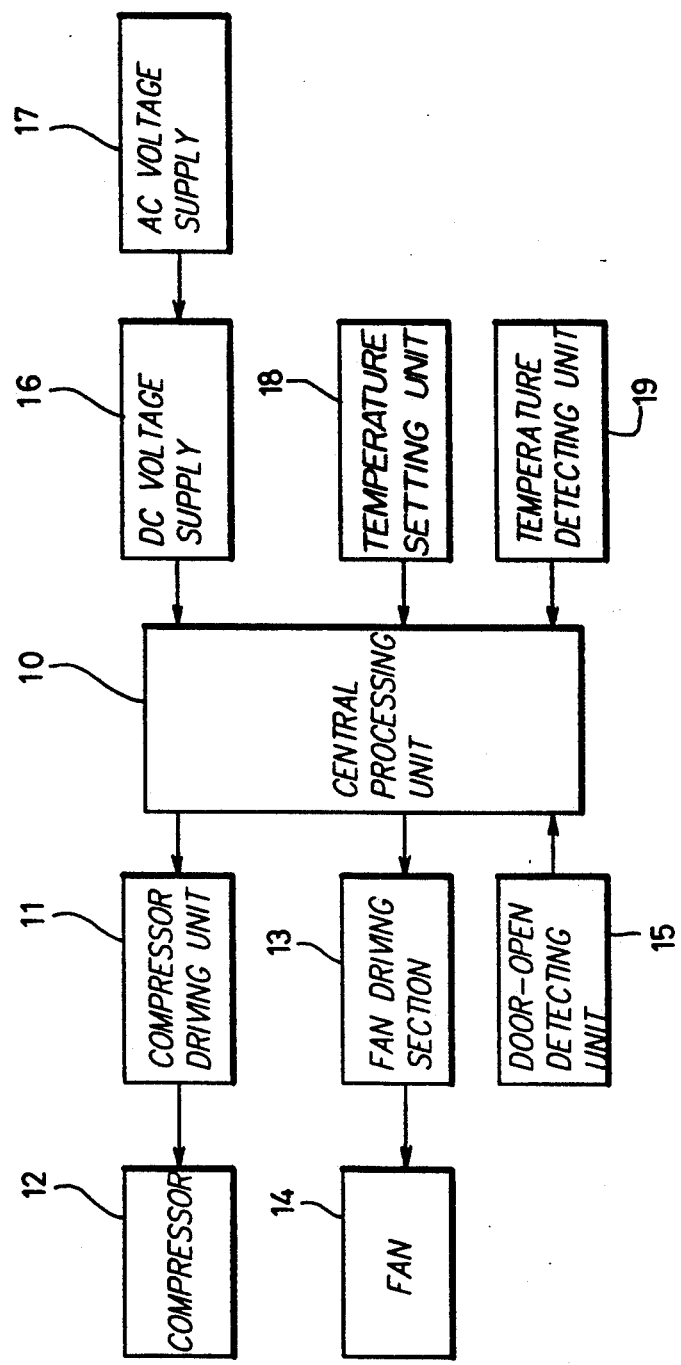
FIG. 1 is a control block diagram of a refrigerator to which the present invention pertains.
Figure 2:
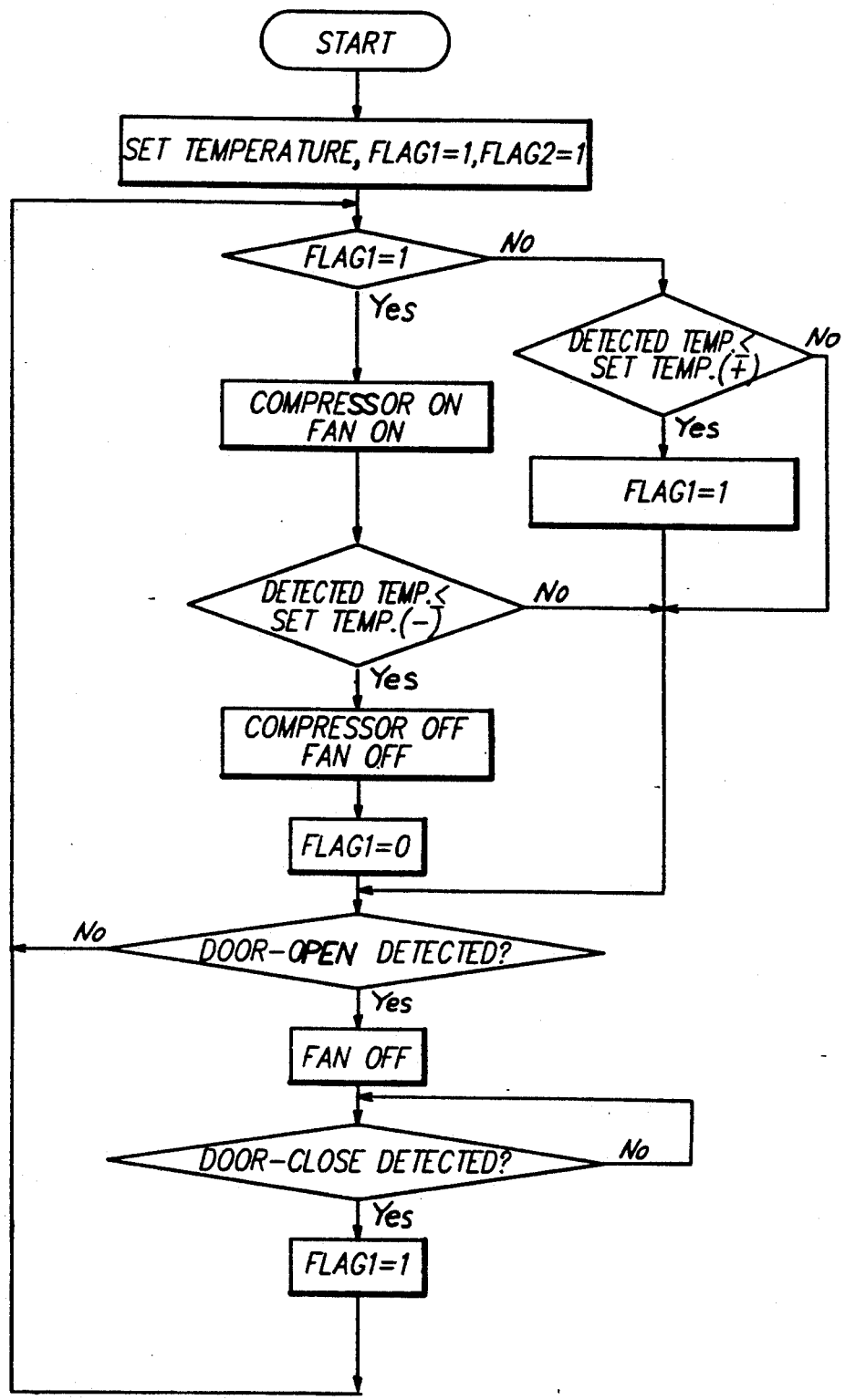
FIG. 2 is a flow-chart of a conventional temperature control for a refrigerator.
Figure 3:
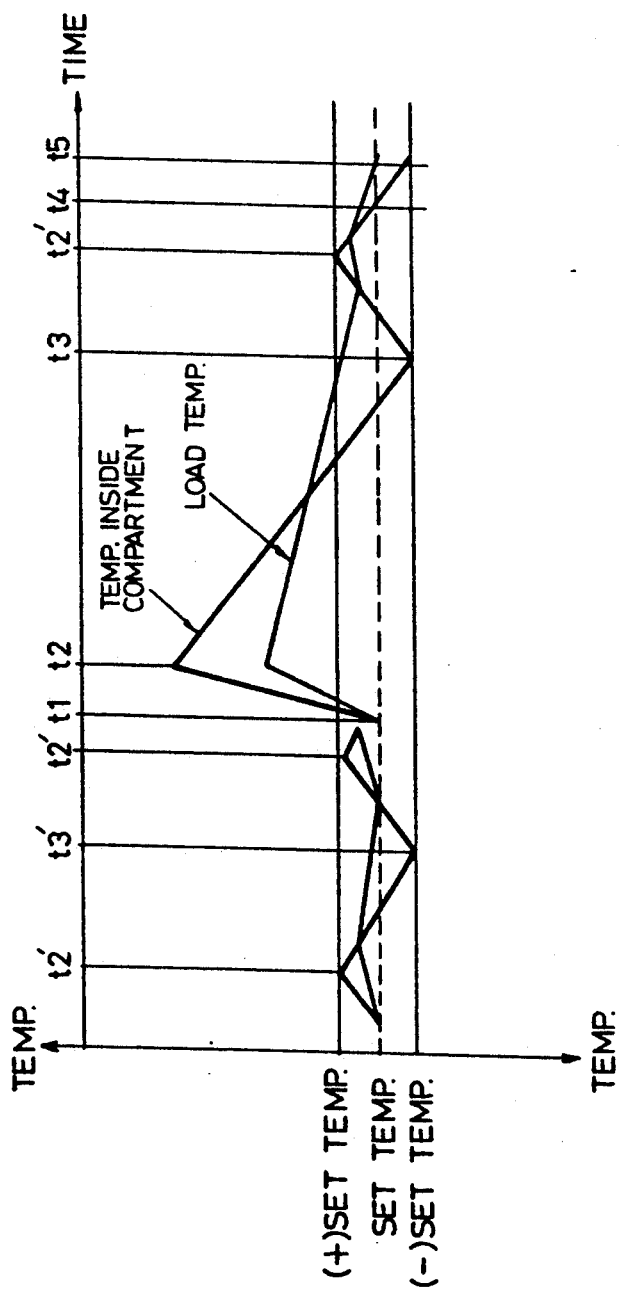
FIG. 3 is a diagram showing the variations of a temperature inside a refrigerating compartment and a load temperature in a conventional refrigerator.
Figure 4:
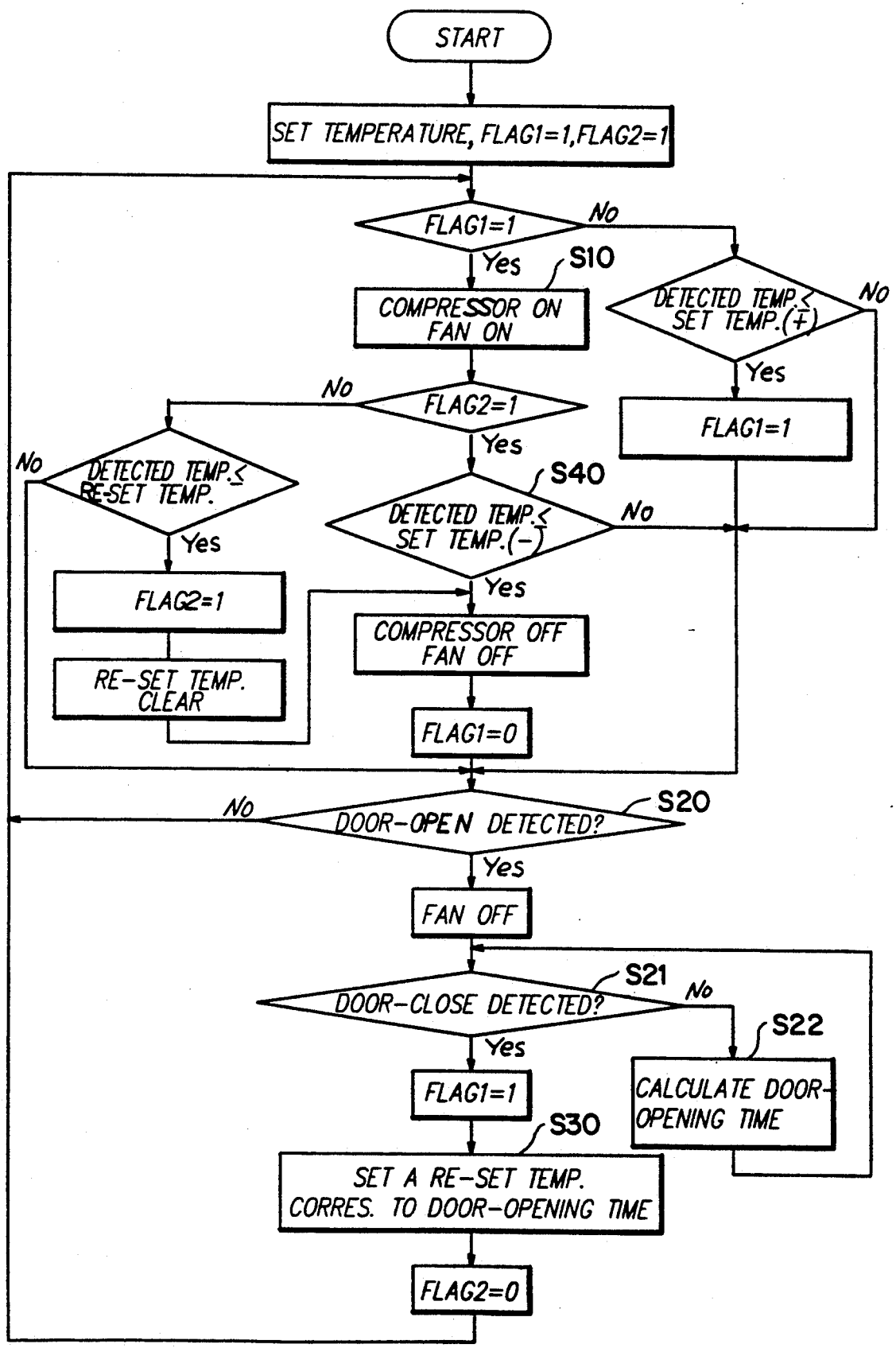
FIG. 4 is a flow-chart of a temperature control for a refrigerator according to the present invention.

The temperature control method of the present invention may be embodied in the operation control system for a refrigerator, as shown in FIG. 1 in a manner that the temperature control program, as shown in FIG. 4, is stored in the central processing unit 10.

When, power is supplied to respective units of the temperature control system via the AC power source 17 and the DC power source 16, the operation of refrigerator is started.

Thereafter, when a user selects a refrigerating temperature via the temperature selecting unit 18, the selected temperature is read out and set by the central processing unit 10 and then an initial condition setting step (S11) for setting a cooling operation flag (FLAG 1) and a temperature re-setting flag (FLAG 2) is executed.

The temperature is set as a positive (+) limit temperature and a negative (−) limit temperature in such a manner that predetermined positive (+) and negative (−) deviations are given to the temperature selected by a user in order to avoid frequent start and stop operations of the compressor.

Upon setting the initial condition, the cooling operation flag (FLAG 1) is checked to determine as to whether it is a cooling operation. If the cooling operation flag (FLAG 1) is in a set state (FLAG 1="1"), a cooling operation step (S12) is executed by turning on the compressor 12 and the fan 14.

Thereafter, a current temperature inside a refrigerating compartment which has been detected at the temperature detecting unit 19 in the cooling operation is compared with the negative (−) limit temperature and a cooling control step (S13) is executed to determine whether to stop the cooling operation. When the temperature inside the refrigerating compartment is higher than the negative (−) limit temperature as a result of the comparison, the cooling operation is continuously executed by driving the compressor 12 and the fan 14 until the temperature inside the refrigerating compartment comes to the negative (−) limit temperature. On the other hand, when the temperature inside the refrigerating compartment is lower than the negative (−) limit temperature as a result of the comparison, the cooling operation is stopped by turning off the compressor 12 and the fan 14 and resetting the cooling operation flag (FLAG 1="0") and then returning to the door-open control step (S20).

On the other hand, when the cooling operation flag (FLAG 1) is in a reset state (FLAG 1="0") upon checking the cooling operation flag (FLAG 1), since the cooling operation is in a stop state, a step (S14) for determining whether to start a cooling operation by comparing the currently detected temperature inside the refrigerating compartment with the positive (+) limit temperature is executed. At this moment, if the currently detected temperature is lower than the positive (+) limit temperature, the next step, i.e., the door-open control step (S20) is executed. However, when the currently detected temperature is higher than the positive (+) limit temperature, the cooling operation flag (FLAG 1) is set to start the cooling operation by driving again the compressor 12 and the fan 14, and then returning to the door-open control step (S20).

At the door-open control step (S20), a door-open discriminating step (S21) is executed to discriminate as to whether a door-open is detected in accordance with a door-open detecting signal of the door-open detecting unit 15. If a door-open is detected at the door-open discriminating step (S21), the fan 14 is turned off and a door-opening time detecting step (S22) for calculating the door-opening time is executed until a door-close is detected.

When a door is closed (t2 in FIG. 5) after the door is opened (t1 in FIG. 5) in a predetermined time, the temperature inside the refrigerating compartment and the load temperature rise abruptly. Accordingly, when the door is closed after opening the door one time, the load temperature can not be dropped down to the user's set temperature if the cooling operation is executed by the normal operation until the temperature inside the refrigerating compartment is lowered to the negative (−) limit temperature. That is, the load temperature is maintained higher than the user's set temperature. Accordingly, in the present invention, the cooling operation is executed until the load temperature is lower than the negative (−) limit temperature so that the load temperature promptly comes to the set temperature in case that a door is closed after a door-open. For this purpose, a temperature re-setting step (S30) is executed.

In the temperature re-setting step (S30), when a door-close is detected at the door-open control step (S20), a cooling operation flag setting step (S31) is executed to restart the compressor 12 and the fan 14, thereafter a re-set temperature setting step (S32) is executed to re-set the refrigerating temperature corresponding to the door-opening time which has been detected at the door-open time detecting step (S22).

The re-set temperature is stored in the central processing unit as a table which is obtained by experimentally calculating a load temperature variation ($T_L$ in FIG. 5) caused by an external air flowing into the refrigerating compartment when the door is opened and a temperature for compensating the variation. That is, re-set temperatures are obtained in correspondence with the door opening time and stored in a table. Thereafter, at the re-set temperature setting step (S32), a re-set temperature corresponding to the door-opening time is read out from the re-set temperature table and then set.

When the re-set temperature setting is finished, a temperature re-setting flag re-setting step (S33) is executed in which the temperature re-setting flag (FLAG 2) is reset (FLAG 2="0") to execute a cooling operation based on the re-set temperature and then the cooling operation flag (FLAG 1) of the normal operation step (S10) is checked.

After the temperature re-setting step (S30), a re-set temperature cooling operation step (S40) is executed when the temperature re-setting flag (FLAG 2) is in a reset state after the compressor and the fan are turned on at the normal operation step (S10). However, if the temperature re-setting flag (FLAG 2) is in a set state, a cooling operation stop discriminating step (S12) is executed while executing a cooling operation based on the normal set temperature.

At the re-set temperature cooling operation step (S40), a currently detected temperature inside the refrigerating compartment is compared with the re-set temperature. When the currently detected temperature is higher than the re-set temperature as a result of the comparison, a re-set temperature cooling operation step (S41) is executed until the temperature inside the refrigerating compartment is dropped down to the re-set temperature, while in case that the currently detected temperature is lower than the re-set temperature, a re-set temperature cooling operation stop step (S42) is executed in which the temperature re-setting flag (FLAG 2) is set (FLAG 2="1") and the re-set temperature is cleared and then proceeding to the door-open control step (S20).

Figure 5:
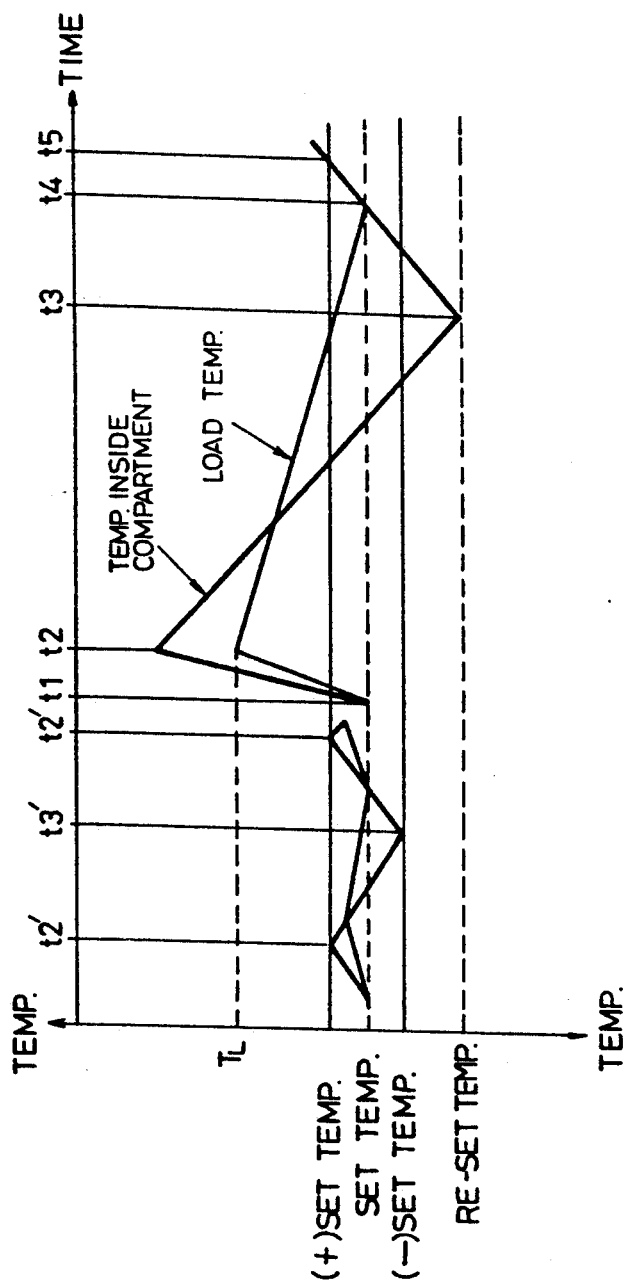
FIG. 5 is a diagram showing the variations of a temperature inside a refrigerating compartment and a load temperature according to the present invention.
Figure 6:
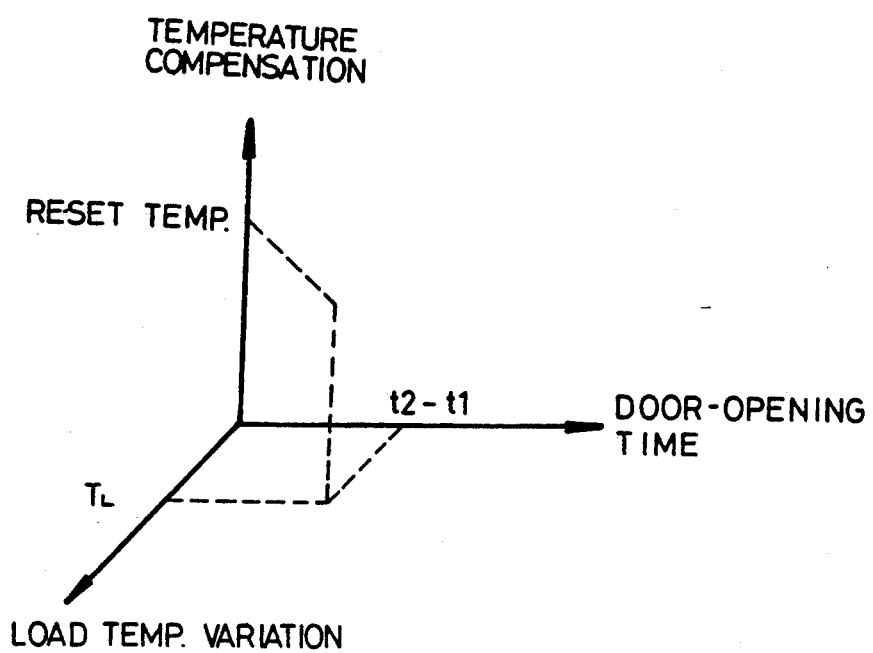
FIG. 6 is a diagram showing the relationship between a door-opening time and a re-setting temperature according to the present invention.

In the temperature control method of the present invention, when a door-open is not detected, a cooling operation is started at the point t2' of FIG. 5 that the temperature inside the refrigerating compartment comes to the positive (+) limit temperature and the cooling operation is stopped at the point t3' of FIG. 5 that the temperature inside the refrigerating compartment comes to the negative (−) limit temperature. Accordingly, the load temperature is maintained between the temperature which has been set by a user and the positive (+) limit temperature.

On the other hand, a cooling operation is started again at the point t2 of FIG. 5 that a door is closed after a door is opened (t1 of FIG. 5). The cooling operation is continued until the temperature inside the refrigerating compartment is dropped down to the re-set temperature which is set as lower than the negative (−) limit temperature and then the cooling operation is stopped at the point t3 of FIG. 5 by turning off the compressor and the fan.

Accordingly, even in case that the load temperature does not drop down to the desired set temperature at the point t3 that the cooling operation is stopped, the load temperature is continuously dropped down to the desired refrigerating temperature during a period (t3−t4) that the temperature inside the refrigerating compartment rises from the re-set temperature to the set temperature. That is, when a door-close is detected after a door-open, since a cooling operation is executed up to the re-set temperature which has been re-set in correspondence to the door-opening time, the load temperature can be dropped down to the desired set temperature, i.e., a food refrigerating temperature by one re-set temperature cooling operation.

Accordingly, comparing the temperature control method of the present invention with the conventional one, there exist the following differences.

That is, in the conventional method, since a cooling operation is executed only until the load temperature comes to the negative (−) limit temperature even after a door-close is detected, the load temperature can not be dropped down to the desired set temperature by one cooling operation after detecting a door-close and accordingly it was required to execute another cooling operation up to the negative (−) limit temperature when the temperature inside the refrigerating compartment rises to the positive (+) limit temperature, thereby lowering the load temperature to the desired refrigerating temperature. However, in the present invention, since the load temperature is dropped down to the desired refrigerating temperature by only one re-set temperature cooling operation, it is possible to promptly stabilize the temperature of load to be refrigerated.

As described above in detail, the present invention provides the effect that since the temperature of food contained in the refrigerating compartment which has risen by external air flowing into the refrigerating compartment in case of a door-open, is promptly restored after a door-close, the refrigerating efficiency of a refrigerator can be enhanced.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A temperature control method for a refrigerator, comprising the steps of:

calculating a door-opening time when a door-open and a door-close are detected during a cooling operation in which a temperature inside a refrigerating compartment is controlled between a positive limit temperature and a negative limit temperature determined according to a set temperature input by a user;

obtaining a reset temperature lower than said negative limit temperature in accordance with the door-opening time; and executing a cooling operation until a temperature inside the refrigerating compartment reaches the reset temperature, such that a time in which a load temperature is equal to the set temperature is reduced.

2. A temperature control method for a refrigerator, comprising the steps of:

(a) controlling a compressor and a fan to maintain a temperature inside a refrigerating compartment between a positive limit temperature and a negative limit temperature, both derived from a set temperature input by a user;

(b) stopping the fan when a door-open is detected and calculating a door-opening time until a door-close is detected;

(c) setting a reset temperature, lower than the set temperature, based on said door-opening time; and (d) executing a cooling operation by driving the compressor and the fan until a temperature inside the refrigerating compartment reaches the reset temperature, if a reset temperature has been set.

3. The temperature control method for a refrigerator as claimed in claim 2, wherein said step (a) comprises the sub-steps of:

(a) (1) setting a positive limit temperature and a negative limit temperature, both derived from the set temperature input by the user, setting a cooling operation flag and resetting a temperature resetting flag;

(a) (2) controlling the cooling operation by driving the compressor and the fan when said cooling operation flag is set and determining whether the temperature resetting flag has been set;

(a) (3) stopping the cooling operation by turning off the compressor and the fan when the temperature inside the refrigerating compartment reaches the negative limit temperature and resetting the cooling operation flag; and (a) (4) comparing the temperature inside the refrigerating compartment with the positive limit temperature when the cooling operation flag has been reset, proceeding to said step (b) when the temperature inside the refrigerating compartment is less than the positive limit temperature, and setting the cooling operation flag when the temperature inside the compartment reaches the positive limit temperature and proceeding to said step (a) (3) via said step (b).

4. The temperature control method for a refrigerator as claimed in claim 2, wherein said step (b) comprises the sub-steps of:

(b) (1) detecting a door-open; and (b) (1) turning off the fan and calculating the door-opening time until the door-close is detected.

5. The temperature control method for a refrigerator as claimed in claim 2, wherein said step (c) comprises the sub-steps of:

(c) (1) setting the cooling operating after the door-close is detected;

(c) (2) setting the reset temperature corresponding to the door-opening time; and (c) (3) resetting the temperature resetting flag and proceeding to said sub-step (a) (3) operating step to reset the cooling operating flag.

6. The temperature control method for a refrigerator as claimed in claim 5, wherein the reset temperature is obtained from a table of various reset temperatures stored in a memory, the various reset temperatures experimentally determined to adjust for a variation in a load temperature caused by the door-open.

7. The temperature control method for a refrigerator as claimed in claim 2, wherein said step (d) comprises the sub-steps of:

(d) (1) comparing the temperature inside the refrigerating compartment with the reset temperature, by checking the temperature resetting flag and proceeding to said sub-step (a) (2) via said step (b); and (d) (2) setting the temperature resetting flag when the temperature inside the compartment reaches the reset temperature and proceeding to said step (a) (3).

8. A temperature control method for a refrigerator, comprising the steps of:

setting a positive limit temperature and a negative limit temperature derived form a set temperature input by a user, and a cooling operation flag and a temperature resetting flag;

cooling a temperature inside a refrigerating compartment until the temperature inside the refrigerating compartment reaches the negative limit temperature by driving a compressor and a fan;

calculating a door-opening time when a door-open and a door-close are detected;

determining and setting a reset temperature depending on the door-opening time, wherein the resetting temperature is lower than the negative limit temperature;

cooling the refrigerating compartment, when it is detected that the reset temperature has been set, until the temperature inside the refrigerating compartment reaches the reset temperature; and comparing the temperature inside the refrigerating compartment with the positive limit temperature to determine when to restart cooling of the compartment during a cooling stop state in which the temperature inside the refrigerating compartment is increasing after the temperature inside the refrigerating compartment has already reached the negative limit temperature or the reset temperature.

* * * * *